United States Patent
Geuens et al.

(10) Patent No.: US 11,859,772 B2
(45) Date of Patent: Jan. 2, 2024

(54) GAS NETWORK AND METHOD FOR DETECTING OBSTRUCTIONS IN A GAS NETWORK UNDER PRESSURE OR UNDER VACUUM

(71) Applicant: ATLAS COPCO AIRPOWER, NAAMLOZE VENNOOTSCHAP, Wilrijk (BE)

(72) Inventors: Philippe Geuens, Wilrijk (BE); Ebrahim Louarroudi, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 454 days.

(21) Appl. No.: 17/311,122

(22) PCT Filed: Nov. 26, 2019

(86) PCT No.: PCT/IB2019/060164
§ 371 (c)(1),
(2) Date: Jun. 4, 2021

(87) PCT Pub. No.: WO2020/115608
PCT Pub. Date: Jun. 11, 2020

(65) Prior Publication Data
US 2021/0381655 A1     Dec. 9, 2021

(30) Foreign Application Priority Data
Dec. 7, 2018 (BE) .................................. 2018/5860

(51) Int. Cl.
F17D 5/00    (2006.01)

(52) U.S. Cl.
CPC .................................. *F17D 5/005* (2013.01)

(58) Field of Classification Search
CPC ......... F17D 5/005; F17D 5/02; G01M 3/2815
See application file for complete search history.

(56) References Cited

FOREIGN PATENT DOCUMENTS

| CN | 102563362 A | 7/2012 |
| CN | 107355684 A | 11/2017 |

(Continued)

OTHER PUBLICATIONS

Khazaali, Thesis: Optimization Procedure to Identify Blockages in Pipeline Networks via non-invasive Technique based on Genetic Algorithms, Lehigh University 2017 (Year: 2017).*

(Continued)

*Primary Examiner* — Regis J Betsch
(74) *Attorney, Agent, or Firm* — Workman Nydegger

(57) ABSTRACT

A method is provided for detecting obstructions in a gas network with sensors, which determine the physical parameters of the gas. The gas network includes controllable throttle valves and with state sensors, which can register the status of throttle valves. The method includes: a training phase in which a mathematical model is established between the measurements of sensors in which one or a plurality of adjustable throttle valves are controlled to generate obstructions; and an operational phase in which the mathematical model established between the measurements of the first and second groups are used to detect obstructions in the gas network. The operational phase includes: calculating the reading of the first and second groups of sensors using the mathematical model; determining the difference between the calculated and read values; and determining the existence of an obstruction on the basis of the aforementioned difference.

15 Claims, 2 Drawing Sheets

(56) References Cited

FOREIGN PATENT DOCUMENTS

| | | | |
|---|---|---|---|
| CN | 207394379 U | 5/2018 | |
| CN | 108730776 A | 11/2018 | |
| WO | 03048713 A1 | 6/2003 | |
| WO | WO-03048713 A1 * | 6/2003 | ............ G01M 3/243 |

OTHER PUBLICATIONS

Japanese Office Action from corresponding JP Application No. 2021-531774, dated Jul. 3, 2023.
International Search Report and Written Opinion from PCT Application No. PCT/IB2019/060164, dated Mar. 16, 2020.
Belgian Search Report from corresponding BE Application No. BE201805860, dated Jun. 28, 2019.
Khazaali, "Optimization Procedure to Identify Blockages in Pipeline Networks via Non-Invasive Technique based on Genetic Algorithms," Theses and Dissertations, Lehigh University, May 1, 2017, 176 pages.

* cited by examiner

GAS NETWORK AND METHOD FOR DETECTING OBSTRUCTIONS IN A GAS NETWORK UNDER PRESSURE OR UNDER VACUUM

BACKGROUND

The current invention relates to a method for detecting obstructions in a gas network under pressure or under vacuum.

More specifically, the invention is intended to be able to detect and quantify obstructions that occur in a gas network.

"Gas" herein means for example air, but not necessarily.

"Obstruction" herein means a partial or total blockage in the gas network or an increase in the resistance of a pipeline.

Methods for monitoring or controlling a gas network under pressure are already known, whereby these methods are set up for long and straight pipelines, where the incoming flow is not necessarily equal to the outgoing flow due to the compressibility of the gas in question.

This method is based on a number of assumptions such as very long pipelines, straight pipelines, which are not suitable for complex gas networks under pressure where one or more compressor plants supply gas under pressure to a complex network of consumers.

However, the aforementioned method relates to the detection of leaks in the gas network.

In Lehigh Preserve ET AL: "Lehigh University Optimization Procedure to Identify Blockages in Pipeline Networks via non-invasive Technique based on Genetic Algorithms", 1 Jan. 2017, a procedure is disclosed to identify blockages in pipeline networks. In WO 03/048713 A1 a pipe inspection apparatus is disclosed.

The disadvantage of such known methods is that they do not allow for the detection of obstructions in a complex network of pipelines between the source and the consumers or consumer areas. In addition, the distribution network of a gas or vacuum network is a source of obstructions that should not be underestimated.

For the detection of obstructions in the gas network, no specific methods are known yet.

The aim of the current invention is to provide a solution to this problem.

SUMMARY

The current invention relates to a method for detecting and quantifying obstructions in a pressurized or vacuum gas network; the gas network comprising:
 one or more sources of compressed gas or vacuum;
 one or more consumers or consumer areas of compressed gas or vacuum applications; pipelines or a network of pipelines to transport the compressed gas or vacuum from the sources to the consumers, consumer areas or applications;
 a plurality of sensors which determine one or a plurality of physical parameters of the gas at different times and locations in the gas network;
characterized in that the gas network is further provided with a number of controllable or adjustable throttle valves situated in the aforementioned pipelines and with one or more state sensors capable of recording the state or status of one or more throttle valves and that the method comprises the following steps:
 a training phase in which a mathematical model is drawn up between the measurements of a first group of sensors and a second group of sensors on the basis of different measurements of these sensors, wherein one or a plurality of adjustable throttle valves are controlled in a predetermined order and according to well-designed scenarios to generate obstructions;
 an operational phase in which the mathematical model established between the measurements of the first group of sensors and the second group of sensors is used to predict obstructions in the gas network;
wherein the operational phase comprises the following steps:
 reading out the first group of sensors;
 from the readout measurements of the sensors, calculating or determining the value of the second group of sensors using the mathematical model;
 comparing the calculated or certain values of the second group of sensors with the read values of the second group of sensors and determining the difference between them;
 determining whether there is an obstruction in the gas network on the basis of the aforementioned difference and any of its derivatives;
 generating an alarm if an obstruction is detected with the corresponding degree of obstruction.

'A predetermined order' in which the adjustable throttle valves are controlled means the order in which the adjustable throttle valves are opened and closed, in case there is more than one.

'Scenarios' mean the different 'open and closed' states of the different adjustable throttle valves, for example [0,0,0,0], [1, 0,0,0], [0,1,1,0], . . . It is possible that there are more states than just open (1) and closed (0), where an intermediate state (for example 1/2) is just as important for obstruction detection and quantification.

The 'derivative of the difference' means any mathematical quantity that can be extracted from the difference, for example a sum, arithmetic mean, smallest squares sum, . . .

The 'consumer area' refers to a group of individual consumers. A gas network may comprise several consumer groups or consumer areas.

An advantage is that such a method will make it possible to learn, detect, locate and also quantify obstructions in the gas network itself.

In other words, the obstructions detected by the method are not limited to obstructions in the sources or consumers of compressed gas, i.e. in the compressor plants and pneumatic tools or components, but may also be obstructions in the pipelines of the gas network itself.

During the training phase, using the measurements of the various sensors, a relationship is established between this group of sensors.

Different measurements are made at different settings of the throttle valves. In other words, different degrees of obstruction are generated in the gas network in a specific order under different test scenarios by partially closing the throttle valves and then reading the measurements from the sensors.

On the basis of all the data, a mathematical model is established between the first group of sensors, or the input of the mathematical model, and the second group of sensors, or the output of the mathematical model. The input or mathematical manipulations are also called 'features' and the output is also called 'targets'.

In this way, a mathematical model will be created that shows the relationship between the different parameters measured by the sensors. These parameters or coefficients are also called 'weights'.

This model will then be used to immediately detect irregularities in future measurements of the sensors by comparing the results of the model and the measurements of the sensors.

In this way, obstructions will be detected, located and quantified very quickly and accurately and, in case of detection of an obstruction, action can be taken and the obstruction can be repaired.

Preferably, the operational phase should be temporarily interrupted or stopped at certain times, after which the training phase should be resumed in order to redefine the mathematical model or the relationship between the measurements of different sensors, before the operational phase is resumed.

It should be noted that the process, i.e. the gas network with sources, pipelines and consumers, is not shut down, but only the method. In other words, if the operational phase is temporarily interrupted or stopped, the sources will still supply gas or vacuum to the consumers.

Interrupting the operational phase and resuming the training phase has the advantage that the mathematical model or relationship is updated.

This will make it possible to take into account, for example, detected obstructions that are being repaired or adjustments or expansions to the gas network that are being made over time.

The invention also concerns a gas network under pressure or under vacuum; the gas network is at least provided with:
- one or more sources of compressed gas or vacuum;
- one or more consumers, consumer areas of compressed gas or vacuum applications; pipelines or a network of pipelines to transport the gas or vacuum from the sources to the consumers, consumer areas or applications;
- a plurality of sensors which determine one or more physical parameters of the compressed gas at different times and locations in the gas network;

with the characteristic that the gas network is further provided with:
- a number of controllable or adjustable throttle valves;
- one or more status sensors capable of recording the state or status of one or more throttle valves;
- a data acquisition control unit for the collection of data from the sensors and for controlling or adjusting the aforementioned throttle valves;
- a computing unit for carrying out the method in accordance with the invention.

Such an arrangement can be used to apply a method in accordance with the invention.

BRIEF DESCRIPTION OF THE DRAWINGS

To better demonstrate the characteristics of the invention, a number of preferred variants of a method and gas network in accordance with the invention have been described below, by way of example without any restrictive character, with reference to the accompanying drawings, in which.

DETAILED DESCRIPTION OF VARIOUS EMBODIMENTS

Figure 1:
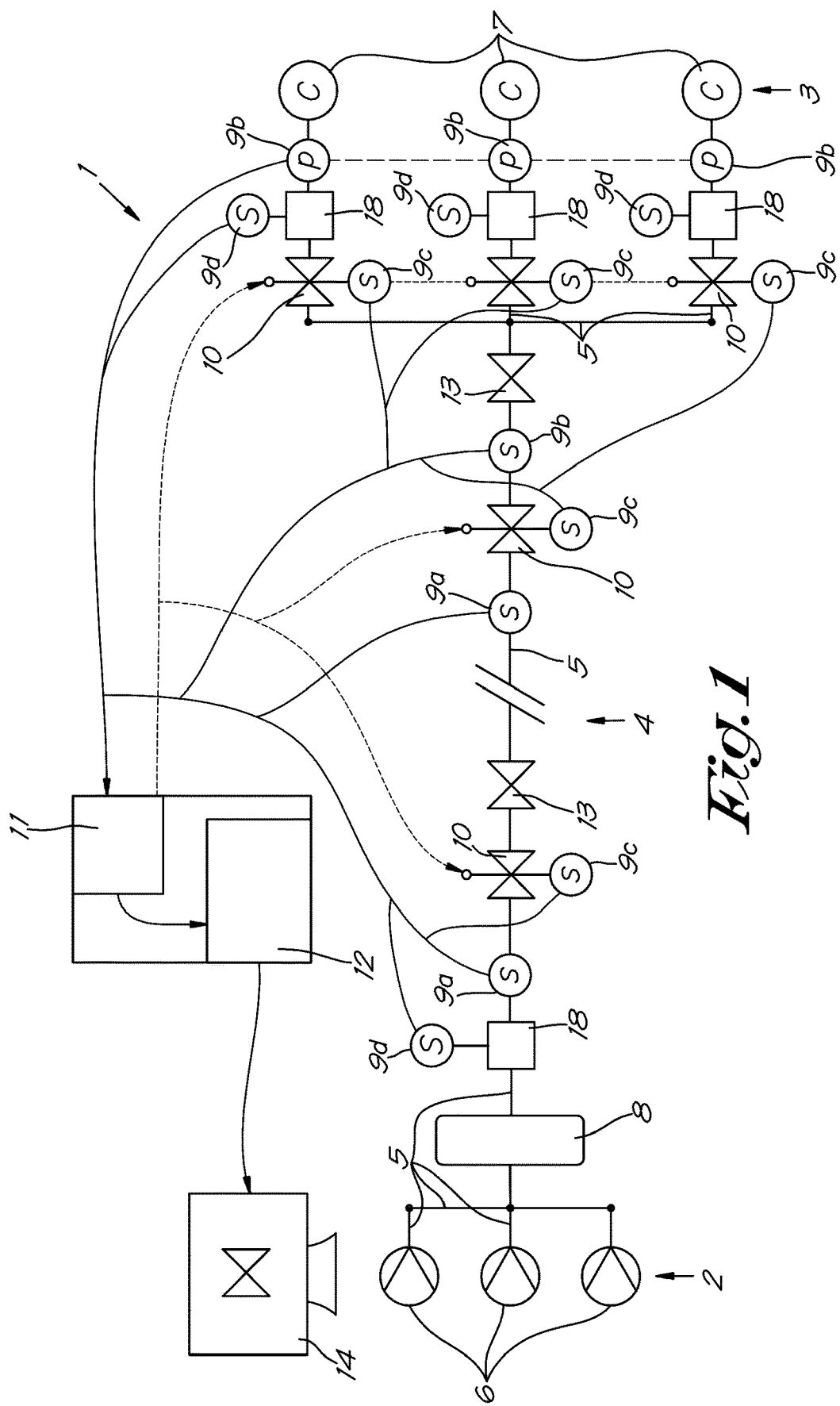
FIG. 1 schematically shows an arrangement in accordance with the invention.

The gas network 1 in FIG. 1 comprises mainly a source side 2, a consumer side 3 and a network 4 of pipelines 5 between the two.

The gas network 1 in this case is a gas network 1 under pressure. For example, the gas can be air, oxygen or nitrogen.

The source side 2 comprises a number of compressors 6, in this case three, which generate compressed air. The consumer side 3 contains a number of consumers 7 of compressed air and in this case also three.

It is also possible that the compressors 6 contain compressed air dryers.

It is not excluded that there may also be compressors 6 downstream of the gas network 1. This is referred to as "boost compressors".

The compressed air is routed through the network 4 of pipelines 5 from the compressors 6 to the consumers 7.

This network 4 is in most cases a very complex network of pipelines 5.

FIG. 1 shows this network 4 in a very schematic and simplified way. In most real situations, the network 4 of pipelines 5 comprises a large number of pipelines 5 and couplings that connect the consumers 7 in series and in parallel with each other and with the compressors 6. It is not excluded that a part of the network 4 adopts or comprises a ring structure.

This is because the gas network 1 is often extended over time with additional consumers 7 or compressors 6, whereby new pipelines 5 between the existing pipelines 5 have to be laid, which leads to a tangle of pipelines 5.

The gas network 1 may also be provided with a pressure vessel 8, with all compressors 6 in front of this pressure vessel 8.

It is not excluded that there may be one or more pressure vessels 8 downstream of the gas network 1.

In addition, components 18, such as filters, separators, atomizers and/or regulators, can also be provided in the gas network 1. These components 18 can be found in various combinations and can be found both near the buffer tank 8 and close to the individual consumers 7.

Network 4 also includes a number of sensors 9a, 9b, 9c, which are located at different locations in network 4.

In this case, two flow sensors 9a have been installed, one of which is just after the aforementioned pressure vessel 8, which will measure the total flow q provided by all compressors 6.

It is possible that the flow rates of the compressors 6 are calculated or measured by themselves.

In addition, the figure shows four pressure sensors 9b, which measure the pressure at different locations in the network 4.

A pressure sensor 9b to measure the pressure in the pressure vessel 8 is also recommended to correct the "mass in—mass out" principle for large, concentrated volumes.

It is clear that more or less than four pressure sensors 9b can also be provided. In addition, the number of flow sensors 9a is not limiting for the invention.

In addition to flow sensors 9a or pressure sensors 9b, additionally, or alternatively, sensors 9a, 9b may be used to determine one or more of the following physical parameters of the gas: differential pressure, temperature, humidity, gas velocity and the like.

In accordance with the invention, the gas network 1 is also provided with a number of throttle valves 10 which are installed in the pipelines 5 at various locations.

These throttle valves 10 can partially close off the pipelines 5 to simulate an obstruction, as it were. They are adjustable or controllable, which means that the extent to which they close off the relevant pipeline 5 can be set or controlled.

In addition to the aforementioned sensors 9a and 9b, which can measure the physical parameters of the gas, there are also a number of sensors 9c, or 'state sensors 9c', which are located at the throttle valves 10. These state sensors 9c can measure the state or status, the opening, i.e. the relative increase or decrease of the thus generated obstruction, of the throttle valves 10. The state sensors 9c can also be replaced by differential pressure sensors 9d, which determine the pressure drop over the throttle valves 10.

In the example shown, a state sensor of this type 9c has been installed for each throttle valve 10.

Preferably, the sensors 9c are part of the throttle valve 10. The sensor 9c is integrated in one module together with the throttle valve 10.

It is not excluded that at least part of the other sensors 9a or 9b are integrated in one module together with a throttle valve 10. This will make it possible to also measure or determine the flow rate through the relevant throttle valve 10.

This will also simplify and speed up the installation or integration of the sensors 9a, 9b and/or 9c and the throttle valves 10. In addition, it can be ensured that a correct and suitable sensor 9a, 9b, 9c for the throttle valves 10 is placed together in one module.

Although not explicitly indicated in FIG. 1, it cannot be excluded that in the gas network 1 there are additional state sensors 9c in the vicinity of the compressors 6 and the consumers 7 that determine the on/off state of these components. Preferably, these state sensors are part of the consumers 7 themselves.

The additional state sensors 9c (e.g. on/off of the compressors 6) then aim to significantly reduce the cross-sensitivity of the model during the training phase 16 and the operational phase 17, as will be explained below.

The aforementioned differential pressure sensors 9d are preferably placed over filter, separator, atomizer and/or regulator components 18. In the current example, four differential pressure sensors 9d have been incorporated into the gas network 1. Differential pressure sensors 9d can also be placed over the throttle valves 10 and then take over the role of the state sensors 9c.

The aforementioned humidity and temperature sensors should preferably be mounted on the inlet/outlet of compressor plants 6 and the consumers 7. In the example shown, these additional sensors are not all included in the gas network 1, but it goes without saying that this is also possible. Especially in more extensive and complex gas networks 1 such sensors 9a, 9b can be used, as well as in networks where only the volumetric flow rate is measured instead of the mass flow rate.

In accordance with the invention, the gas network 1 is further provided with a data acquisition control unit 11 to collect data from the aforementioned sensors 9a, 9b, 9c, 9d and also to control the throttle valves 10.

In other words, sensors 9a, 9b, 9c, 9d determine or measure the physical parameters of the gas and send this data to the data acquisition control unit 11, and the data acquisition control unit 11 will control or check whether and how many of the throttle valves 10 are closed to create or simulate an obstruction.

In accordance with the invention, the gas network 1 is further provided with a computing unit 12 for processing the data from sensors 9a, 9b, 9c, 9d, wherein the computing unit 12 will be able to carry out the method for detecting and quantifying obstructions 13 in the gas network 1 in accordance with the invention, as explained below.

The aforementioned computing unit 12 can be a physical module which is a physical part of the gas network 1. It cannot be excluded that the computing unit 12 is not a physical module, but a so-called cloud-based computing unit 12, which may or may not be connected wirelessly to the gas network 1. This means that the computing unit 12 or the software of computing unit 12 is located in the 'cloud'.

In this case, the gas network 1 is further provided with monitor 14 to display or signal obstructions 13 that were detected using the method.

The operation of gas network 1 and the method in accordance with the invention is very simple and as follows.

Figure 2:
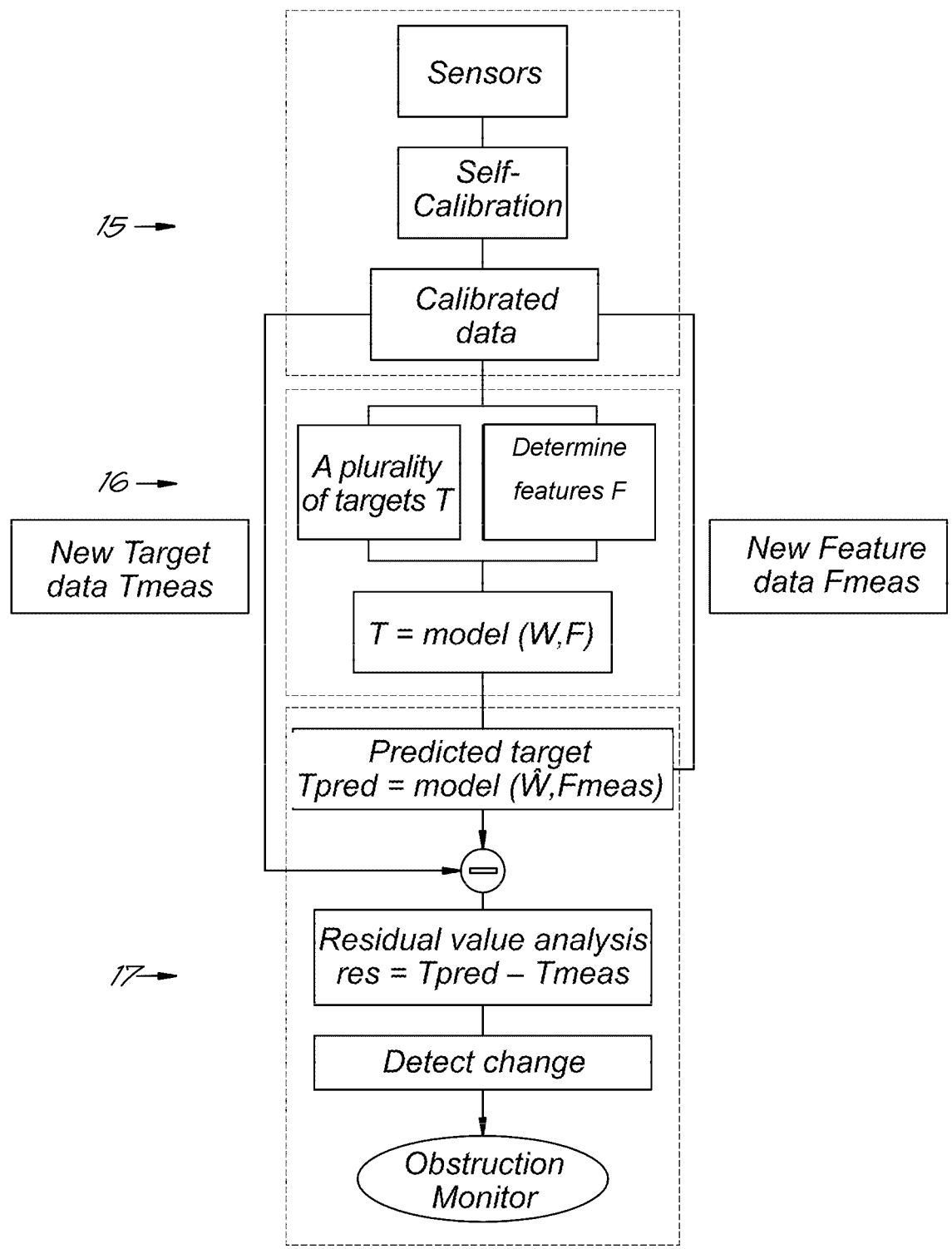
FIG. 2 shows a schematic flowchart of the method in accordance with the invention.

FIG. 2 schematically illustrates the method for detecting obstructions 12 in the gas network 1 of FIG. 1.

In the first phase 15, the start-up phase 15, sensors 9a, 9b, 9c, 9d, are calibrated before use if necessary. It goes without saying that if there are other sensors, they can also be calibrated before use.

This happens once when the sensors 9a, 9b, 9c are placed in the gas network 1. Of course, it is possible that sensors 9a, 9b, 9c, 9d, may be recalibrated over time.

Preferably, at least some of the sensors 9a, 9b, 9c, 9d, should be calibrated during operation or by means of an in-situ self-calibration. This means that sensors 9a, 9b, 9c, 9d, in the gas network 1, i.e. after they have been installed, are calibrated. "In operation" or "in situ" means calibration without removing sensor 9a, 9b, 9c, 9d, from the gas network 1.

Of course, all sensors 9a, 9b, 9c, 9d, may be calibrated in operation or in situ by means of self-calibration.

In this way you can be sure that the placement and/or possible contamination of the sensors 9a, 9b, 9c, 9d, will not affect their measurements, because only after the placement of the sensors 9a, 9b, 9c, 9d, will you perform the calibration or repeat the calibration for a certain period of time.

Then the second phase 16 or the training phase 16 starts.

In this phase, a mathematical model is made between the measurements of a first group of sensors 9a, 9b, 9c, 9d, or the 'features' and a second group of sensors 9a, 9b, 9c, 9d, or the 'targets'.

Preferably, the first group of sensors 9a, 9b, 9c, 9d, comprises a plurality of pressure sensors 9b, possibly a number of flow sensors 9a and possibly a number of state sensors 9c at different locations in the gas network 1, and the second group of sensors 9a, 9b, 9c, 9d, comprises a plurality of state sensors 9c at different locations in the gas network 1.

In this case, the flow sensors 9a, the pressure sensors 9b and part of the state sensors 9c form the first group of sensors and the remaining state sensors 9c form the second group of sensors.

For the sake of completeness, it is stated here that the invention is not limited to this. For the first group of sensors 9a, 9b, 9c, 9d, and the second group of sensors 9a, 9b, 9c, 9d, a random selection can be made, with the only restriction that a sensor from the first group may not be in the second group and vice versa.

The aforementioned mathematical model is based on various measurements of sensors 9a, 9b, 9c, 9d where the adjustable throttle valves 10 are controlled by the data acquisition control unit 11 to simulate or generate obstructions 13.

In other words, the data acquisition control unit 11 collects data or measurements from sensors 9a, 9b, 9c, 9d, where the data acquisition control unit 11 will control the throttle valves 10 to close them so that obstructions are created in the gas network 1 so that data can be collected from sensors 9a, 9b, 9c, 9d, when obstructions 13 occur in the gas network 1.

In this way, a whole set of data or measurements can be collected, together with the information from the throttle valves 10, i.e. the location and size of the obstructions 13. The computing unit 12 will make a mathematical model on the basis of all this information. This mathematical model is preferably a black-box model or a data-driven model. The model typically contains a number of parameters or coefficients, also called 'weights', which are estimated.

The black-box model, for example, takes the form of a matrix or a non-linear mathematical vector function or the like.

The mathematical model is based on a number of assumptions. In this case, it is assumed that there are no leaks in the gas network 1.

The training phase 16 should preferably be carried out during the operation or operational phase of the gas network 1.

The mathematical model is used in an operational phase 17 to detect, locate and quantify obstructions 13 in the gas network 1. Although not common, it cannot be excluded that during the operational phase the adjustable throttle valves 10 are controlled in a predetermined order to locate obstructions 13.

In this phase 17, the following steps are performed:
reading out the first group of sensors 9a, 9b, 9c, 9d;
based on the readout measurements of sensors 9a, 9b, 9c, 9d, calculating or determining the value of the second group of sensors 9a, 9b, 9c, 9d, using the mathematical model, also known as 'predicted target';
comparing the calculated or determined values of the second group of sensors 9a, 9b, 9c, 9d with the read values of the second group of sensors 9a, 9b, 9c, 9d, and determining the difference between them;
determining whether there is an obstruction 13 present in the gas network 1 on the basis of the aforementioned difference and any of its derivatives;
generating an alarm if an obstruction 13 is detected.

In order to determine an obstruction 13 in the gas network 1, in the penultimate step it will be examined whether the aforementioned difference exceeds a certain threshold value. This indicates an obstruction 13 in the gas network 1.

This threshold can be set or selected in advance.

When an obstruction 13 is detected, an alarm will be generated. In this case, this is done using monitor 14, which displays the alarm.

The user of the gas network 1 will notice this alarm and be able to take the appropriate steps.

These steps of the operational phase 17 are preferably repeated sequentially at a certain time interval.

This means that during the entire operational period of the gas network 1, obstructions 12 can be detected and not just once during or shortly after the start up of the gas network 1.

The aforementioned time interval can be selected and set depending on the gas network 1. It cannot be excluded that the time interval may vary over time.

In a preferred variant of the invention, at certain moments, the operational phase 17 will be temporarily interrupted or stopped, after which the training phase 16 will resume to redefine the mathematical model between the measurements of different sensors 9a, 9b, 9c, 9d, before the operational phase 17 is resumed.

'At certain moments' should herein be interpreted as moments that are preset, for example once a week, per month or per year, or as moments that can be chosen by the user.

This will update the mathematical model to take into account any time-varying behavior of the system.

These include, for example, obstructions 12 in the network 4 which, by replacing the relevant parts or valves, will be repaired to existing small obstructions 12 in the base-line situation, which will become larger over time and must be taken into account, or adjustments or expansions of the network 4 which will change the aforementioned base-line situation of the gas network 1.

Although in the example of FIG. 1 it is a gas network 1 under pressure, it can also be a gas network 1 under vacuum.

Source side 2 then comprises a number of sources of vacuum, i.e. vacuum pumps or similar.

In this case, the consumers 7 have been replaced by applications that require vacuum.

Furthermore, the method is the same as disclosed above.

This invention is by no means limited to the embodiments by way of example and shown in the figures, but such a method and gas network as claimed in the invention can be carried out in different variants without going beyond the scope of the invention.

The invention claimed is:

1. A method for detecting, locating and quantifying obstructions in a gas network under pressure or vacuum; the gas network comprising:
one or more sources of compressed gas or vacuum;
one or more consumers or consumer areas of compressed gas or vacuum applications;
pipelines or a network of pipelines to transport the compressed gas or vacuum from the sources to the consumers, consumer areas or applications;
a plurality of sensors providing one or more physical parameters of the gas at different times and locations within the gas network;
wherein the gas network is further provided with a number of controllable or adjustable throttle valves situated in the aforementioned pipelines and with one or more state sensors capable of recording the state or status of one or more throttle valves and that the method comprises the following steps:
a training phase in which a mathematical model is drawn up between the measurements of a first group of sensors comprising a plurality of pressure sensors, possibly a number of flow sensors and possibly a number of state sensors at different locations in the gas network and a second group of sensors on the basis of different measurements of these sensors, the second group of sensors comprising a plurality of state sensors at different locations in the gas network,
wherein a sensor from the first group is not in the second group and vice versa,
wherein one or a plurality of adjustable throttle valves are controlled in a predetermined order and according to well-designed scenarios to generate obstructions;
an operational phase in which the mathematical model established between the measurements of the first group of sensors and the second group of sensors is used to detect, locate and quantify obstructions in the gas network;
wherein the operational phase comprises the following steps:
reading out the first group of sensors;

from the readout measurements of the sensors, calculating or determining the value of the second group of sensors using the mathematical model;

comparing the calculated or determined values of the second group of sensors with the read values of the second group of sensors and determining the difference between them;

determining whether an obstruction is present in the gas network on the basis of the aforementioned difference and any of its derivatives comprising a mathematical quantity extractable from the difference;

generating an alarm if an obstruction is detected and/or determining the location of the obstruction and the degree of obstruction and/or generating the associated obstruction cost, wherein the location is determined by controlling the adjustable throttle valves 10 in a predetermined order.

2. The method according to claim 1, wherein the method for the training phase comprises a start-up phase in which the aforementioned sensors are calibrated before use.

3. The method according to claim 2, wherein the sensors are calibrated by means of an in-situ self-calibration.

4. The method according to claim 1, wherein the aforementioned sensors can measure one or more of the following physical parameters of the gas:

pressure, differential pressure, temperature, flow, gas velocity and humidity.

5. The method according to claim 1, wherein the operational phase is temporarily interrupted or stopped at certain moments, after which the training phase is resumed in order to redefine the mathematical model between the measurements of different sensors before the operational phase is resumed.

6. The method according to claim 1, wherein the operational phase steps are sequentially repeated at a given time interval.

7. The method according to claim 1, wherein at least part of the sensors together with a throttle valve are integrated in one module.

8. The method according to claim 1, wherein in the vicinity of each throttle valve in the gas network, a sensor is provided and/or vice versa.

9. The method according to claim 1, wherein the mathematical model is a black-box model.

10. The method according to claim 1, wherein the aforementioned mathematical model takes the form of a matrix and/or a nonlinear vector function with parameters or constants, where the changes of the output or 'targets' of the mathematical model are tracked during the operational phase.

11. The method according to claim 1, wherein it is gas, air, oxygen or nitrogen or another non-toxic and/or dangerous gas or mixture of gases.

12. A gas network under pressure or under vacuum, the gas network is at least provided with:

one or more sources of compressed gas or vacuum;

one or more consumers, consumer areas of compressed gas or vacuum applications;

pipelines or a network of pipelines to transport the gas or vacuum from the sources to the consumers, consumer areas or applications;

a plurality of sensors providing one or more physical parameters of the gas at different times and locations within the gas network;

wherein the gas network is further provided with:

a number of controllable or adjustable throttle valves;

one or more status sensors capable of recording the state or status of one or more throttle valves;

a data acquisition control unit for the collection of data from the sensors and for controlling or adjusting the aforementioned throttle valves;

a computing unit for carrying out the method according to claim 1.

13. The gas network according to claim 12, wherein at least some of the sensors together with a throttle valve are integrated in one module.

14. The gas network according to claim 12, wherein the gas network is further provided with a monitor to display or signal obstructions.

15. The gas network according to claim 12, wherein the computing unit is a cloud-based computing unit, which is connected to the gas network, either or not wireless.

* * * * *